United States Patent [19]

Hagin

[11] Patent Number: 4,745,745
[45] Date of Patent: May 24, 1988

[54] ENERGY STORAGE DEVICE

[75] Inventor: Faust Hagin, Munich, Fed. Rep. of Germany

[73] Assignee: MAN Nutzfahrzeuge GmbH, Munich, Fed. Rep. of Germany

[21] Appl. No.: 69,003

[22] Filed: Jul. 1, 1987

[30] Foreign Application Priority Data

Jul. 2, 1986 [DE] Fed. Rep. of Germany ....... 3622120
Feb. 12, 1987 [DE] Fed. Rep. of Germany ....... 3705642

[51] Int. Cl.$^4$ ............................................. F16H 39/46
[52] U.S. Cl. ........................................ 60/414; 60/413; 138/31
[58] Field of Search ................. 60/413, 414, 415, 416, 60/418; 138/31

[56] References Cited

U.S. PATENT DOCUMENTS 2,406,197  8/1946  Christensen ........................... 138/31
4,188,787  2/1980  Bromell et al. ................... 60/416 X
4,227,587 10/1980  Carman ............................. 60/414 X
4,631,918 12/1986  Rosman ............................ 60/414 X Primary Examiner—Edward K. Look
Attorney, Agent, or Firm—Scully, Scott, Murphy & Presser

[57] ABSTRACT

An energy storage device comprising a high pressure liquid accumulator, a low pressure liquid accumulator and at least one pump and motor unit, i.e. a device able to be used as a pump and a motor which is connected to a means, such as the drive train of a vehicle, supplying or absorbing energy as the case may demand and during charging of the high pressure liquid accumulator from the low pressure accumulator functions as a pump and on discharge thereof functions as a motor, at least that pressure line connecting the high pressure accumulator and the pump and motor unit having a shut off valve therein. A piston delimiting the storage space of the low pressure liquid accumulator is connected to a telescoping cylinder bearing against the end plate of the accumulator and the cylinder is connected via an operating pressure line with the high pressure accumulator for pressurization. On charging of the high pressure accumulator with an accompanying discharge of the low pressure accumulator it is thus possible to avoid a fall in the pressure in the latter to an overly low level; in fact the pressure fluctuates about an average value between a relatively high minimum value and a maximum value. The latter feature is due to the changing size of the active pressure faces as the telescoping pressure cylinder is extended one part after another.

14 Claims, 3 Drawing Sheets

ENERGY STORAGE DEVICE

BACKGROUND OF THE INVENTION

The invention relates to an energy storage device comprising a high pressure liquid accumulator, a low pressure liquid accumulator and at least one pump and motor unit, i.e. a device able to be used as a pump and a motor which is connected to a means supplying or absorbing energy as the case may demand and during charging of the high pressure lator functions as a pump and on discharge thereof functions as a motor, at least that pressure line connecting the high pressure accumulator and the pump and motor unit having a shut off valve therein.

In the prior art, see for example the German patlator functions as a pump and on discharge thereof functions as a motor, at least that pressure line connecting the high pressure accumulator and the pump and motor unit having a shut off valve therein.

In the prior art, see for example the German Pat. No. 2,904,572, low pressure liquid accumulators have so far been used, in which during discharge the pressure sinks relatively sharply from a maximum to a relatively low pressure. In the case of high flow rates this leads to cavitation and possibly to an overly low operating pressure. The design and workings of such liquid accumulators are described for example in the German periodical "Der Konstrukteur", 12/1984, pages 51 through 59.

SHORT SUMMARY OF THE PRESENT INVENTION

Accordingly one object of the invention is to so improve on the energy storage device of the initially mentioned type that the pressure in the accumulator space of the low pressure accumulator is subject to less pronounced fluctuations during charging and discharging.

A further aim of the invention is to devise such an energy storage device in which the danger of cavitation is reduced.

In order to achieve these or other objects appearing in the course of the present specification and claims, a piston delimiting the storage space of the low pressure liquid accumulator is connected to a telescoping cylinder bearing against the end plate of the accumulator and the cylinder is connected via an operating pressure line with the high pressure accumulator for pressurisation.

The provision of the telescopic pressure cylinder in accordance with the invention and the possibility of pressurizing it from the high pressure liquid accumulator mean that it is possible to avoid any excessive drop in the pressure in the storage space of the low pressure liquid accumulator. The latter feature is due to the acting pressure surfaces of the telescopic pressure cylinder, which vary along the stroke of the piston, the pressure in the storage space being able to vary by equal amounts above and below a mean value.

Advantageous further developments of the invention will be seen from the claims.

The following account will present the reader with details of further features and advantages of the apparatus in accordance with the invention having reference to the drawings.

LIST OF THE SEVERAL VIEWS OF THE DRAWINGS

DETAILED DESCRIPTION OF WORKING EXAMPLE OF THE INVENTION

Figure 1:
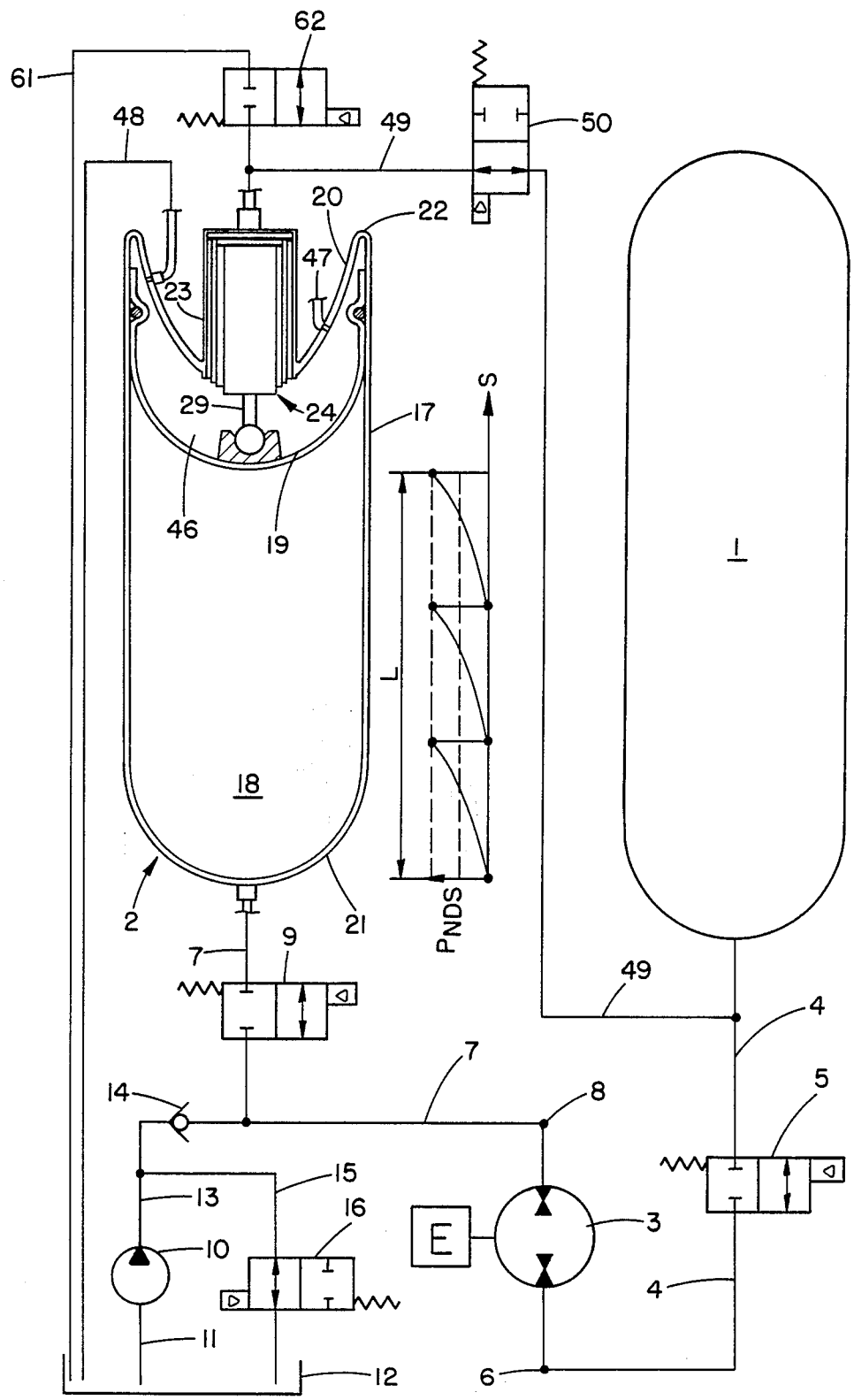
FIG. 1 is a schematic of an energy storage device in accordance with the invention.

The energy storage device shown in FIG. 1 is made up of a high pressure liquid accumulator 1 which may be of conventional design, a low pressure liquid accumulator 2 designed in accordance with the invention and at least one pump and motor unit 3.

The latter is connected with a device E which supplies and absorbs energy, as for example an electrical machine or the drive train of a motor vehicle. In this latter case the energy storage device would be used to function as a brake energy recovery device. The pump and motor unit 3 shown may be switched over between operation as a motor (+) through a neutral setting to operation as a pump (−) and back again. However it would alternatively be possible to use a pump and motor unit which would not itself be able to be switched over and would be connected with a special-purpose reversing device for causing the change over between charging and discharging of the high pressure liquid accumulator. In the working example here envisaged the pump and motor unit 3, which may be switched over per se, functions as a pump during charging of the high pressure liquid accumulator 1 from the low pressure liquid accumulator 2 and during discharge of the high pressure liquid accumulator 1 back into the low pressure liquid accumulator 2 it functions as a motor. These operations take place via a pressure line 4 having a controlled shut off valve 5 thereon and which extends between the high pressure liquid accumulator 1 and the one port 6 of the pump and motor unit 3, and furthermore via a pressure line 7 joining with the other port 8 of the pump and motor unit 3 and then leading to the low pressure liquid accumulator 2. To take care of the situation in which the pressure level obtaining in the low pressure liquid accumulator 2 is greater than the pumping pressure level in the pump and motor unit 3 there is a controlled shut off valve 9 on the pressure line 7. This case is illustrated in the drawing.

For the basic charging of this accumulator system there is a constant pressure feed pump 10, which is connected via an intake line 11 with a tank 12 for hydraulic oil and whose outlet port is connected via a line 13, on which there is a check valve 14 opening in the direction of pumping, with the part, extending between the pump and motor unit 3 and the shut off valve 9, of the pressure line 7 leading to the low pressure liquid accumulator 2. From the line 13 at a point upstream from the check valve 14 there branches a shunting line 15 returning to the tank 12 and on this line there is furthermore a controlled shut off valve 16 for closing and opening this line to a greater or lesser extent.

The low pressure liquid accumulator 2 is of the piston type, which comprises an internally cylindrical housing 17, a piston 19 delimiting the storage space 18 and an operating device for the piston. The piston 19 of the low pressure liquid accumulator 2 has a hemispherical or frustoconical (i.e. tapering) form with a convexly curved pressure surface to which the inner surface of the end 21 of the housing 17, opposite to the storage space 18 is complementary. The end plate 20 of the accumulator is also made hemispherical or frustoconical with an adjacent peripheral rim 22 in order to increase its strength, such hemispherical or frustoconical part extending into the interior of the accumulator. There is a wall 23 in the center of the end plate 29 for receiving the operating device for the piston 19. This operating device is a telescopic pressure cylinder generally referenced 24 which at one end bears against the end plate 20 of the accumulator, that is to say on the flat end surface of the wall 23 which is here reinforced by an end plate 25 (FIG. 2), and at the other end is connected with the piston 19.

Figure 2:
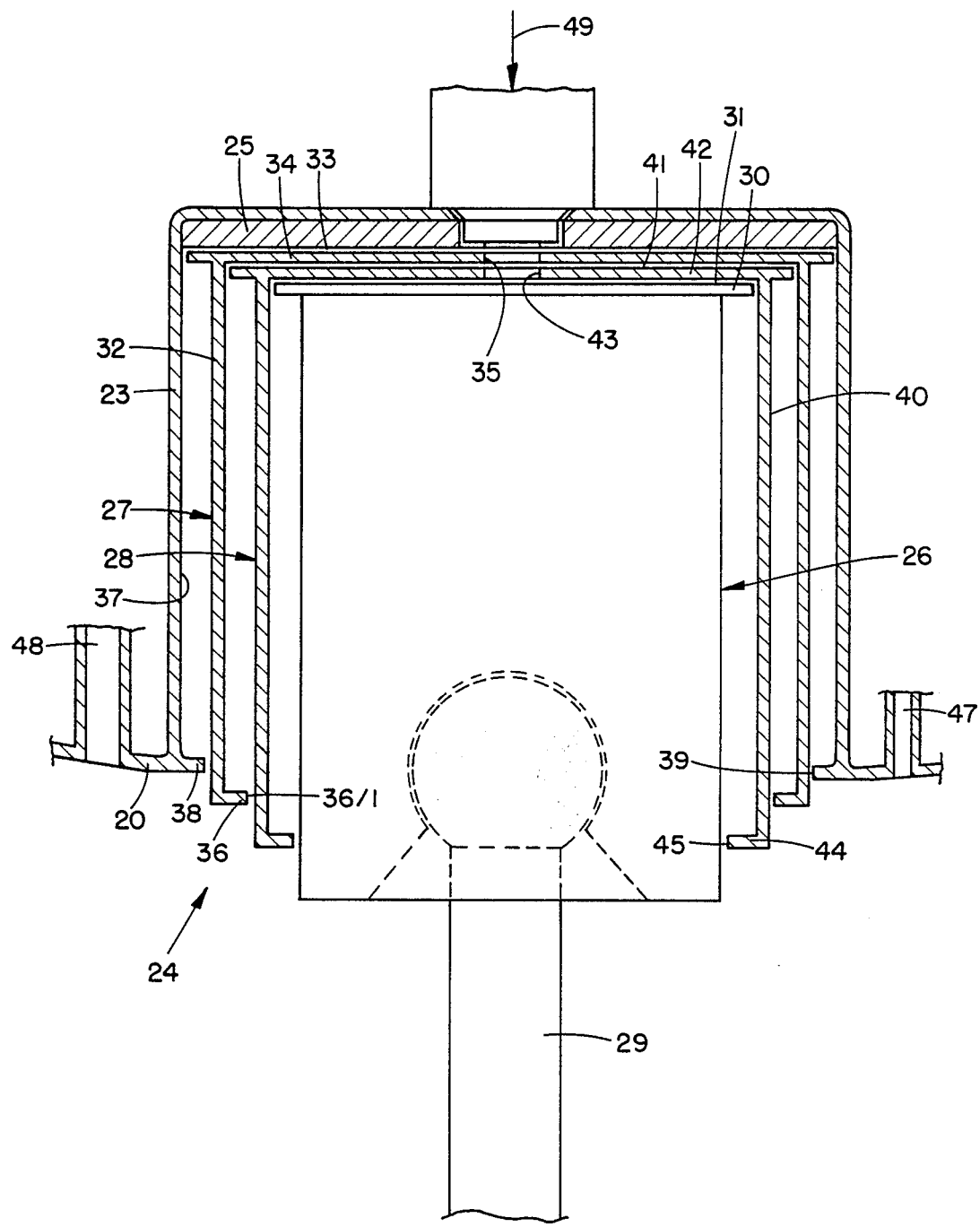
FIG. 2 is a view on a larger scale of part of the low pressure liquid accumulator in accordance with the invention.

As regards details, the telescopic pressure cylinder 24, see FIG. 2, consists of a central pressure piston 26 and at least one or more especially two or more nested pressure cylinders cooperating with the piston 26. In the illustrated working example there are two such pressure cylinders 27 and 28, the outer cylinder being referenced 27 and the inner one being referenced 28. The pressure piston 26 is coupled in an articulated manner by way of a connecting rod 29 with a ball-end, held in a ball socket for example, on the concave outer side of the pressure piston 19 and at its opposite end it has a thrust plate 30, with a larger diameter, having a terminal thrust surface. The outer pressure cylinder 27 has a cylindrical guide wall 32, which at one end is limited by a thrust plate 34, which in the retracted state of the telescopic pressure cylinder 24 has its end face 33 bearing on the end plate 25, having a central oil passage 35, while the other end is delimited by a stroke limiting plate 36, serving to limit the stroke of the internal pressure cylinder 28, with a central opening or inner diameter 36/1. The thrust plate 34, which has a diameter larger than the guide wall 32, is to serve as a sealing guide means within the cylindrical wall 37 of the receiving wall 32. In order to limit the stroke of the outer pressure cylinder 27 the inner end of the receiving wall 23 is provided with a stroke limiting rim 38, whose inner diameter 39 may if necessary be provided with a seal to ensure a sealing and guiding action on the guide wall 32. The inner pressure cylinder 28 has a cylindrical guide wall 40, which at one end is limited by a thrust plate 42 (having a central oil passage 43) whose end face 41 rests in the retracted state of the telescopic pressure cylinder 24 on the thrust plate 34 of the outer pressure cylinder 27, and at the other end bears a plate 44 limiting the stroke of the pressure piston 26. Furthermore the guide wall 40 is guided in a sealing manner in the stroke limiting rim 36 which if needed is furnished with a separate seal. The thrust plate 42, which has a larger diameter than the guide wall 40, is designed to provide a pressure-tight sealing action within the guide wall 32 of the outer pressure cylinder 27. The stroke limiting plate 44 is provided with a central opening or inner diameter 45 having a seal if appropriate so as to ensure a liquid-tight guiding action on the pressure piston 26. The thrust plate 30 of the piston 26 is designed to ensure a pressure-tight guiding function in the guiding wall 40 of the inner pressure cylinder 28.

Between the piston 19 of the low pressure liquid accumulator 2 and the accumulator end plate 20 there will always be a space 46 whatever the operational state of the telescopic pressure cylinder 24 and this space is connected via a vent tube 47 with the atmosphere and via a line 48 with the tank 12. The space 46 may be at least partly filled with hydraulic oil and then forms a pressure-free oil storage means, which makes it possible for the tank 12 to be made smaller in design in a way commensurate with the volume concerned required.

The telescopic pressure cylinder 24 is connected via an operating pressure line 49, on which there is a controlled shut off valve 50, with the high pressure liquid accumulator 1 for pressurisation. The shut off valve 50 serves only for safety purposes and is not absolutely necessary, more especially if the telescopic pressure cylinder 24 in the receiving wall 23 is reliably sealed off from the space 46. It is preferred for the operating pressure line 49 to branch off from the part, placed between the high pressure liquid accumulator 1 and the shut off valve 5, of the pressure line 4 leading to the pump and motor unit 3. At the other end the operating pressure line 49 is connected with the end plate 25 of the receiving wall 23 in a part behind the thrust plate 34 of the external pressure cylinder 27.

Figure 3:
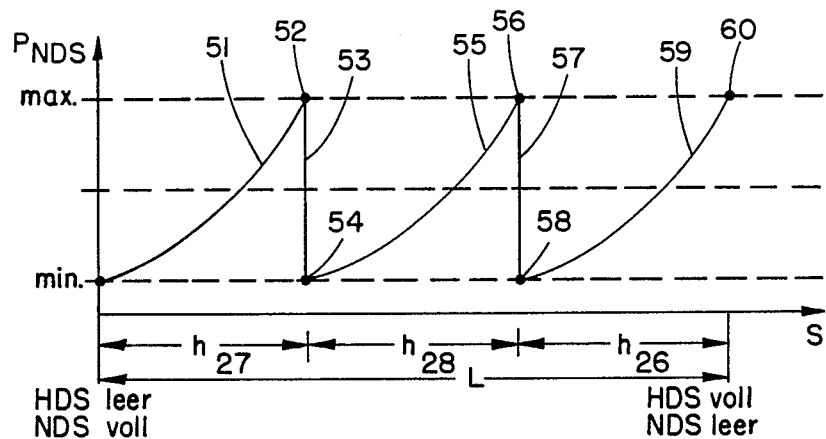
FIGS. 3, 4 and 5 are respective graphs of pressure against displacement to describe a full discharge cycle of the low pressure liquid accumulator.

When the shut off valve 50 is turned on the telescopic pressure cylinder 24 will be put under pressure via the operating pressure line 49 of the high pressure accumulator 1. Details in this respect will be given below. The pressure piston 26 and the pressure cylinders 27 and 28 are so matched in the present working example of the invention that each of these stroke elements (the piston and the cylinders) 26, 27 and 28 of the telescopic pressure cylinder 24 may move through the same amount of stroke within the respective surrounding stroke element when it is put under pressure. This case is indicated in the graph of FIG. 3, the inherent stroke of the pressure piston 26 being denoted $h_{26}$, the inherent stroke of the pressure cylinder 27 being denoted as $h_{27}$, the inherent stroke of the pressure cylinder being denoted $h_{27}$ and the inherent stroke of the pressure cylinder 28 being denoted $h_{28}$. The overall stroke L, through which the piston 19 of the low pressure liquid accumulator 2 may move in its housing 17 when the telescopic pressure cylinder 24 is put under pressure and with a full extension of all the stroke parts 26, 27 and 28 is the sum of $h_{27}$, $h_{28}$ and $h_{26}$.

Figure 4:
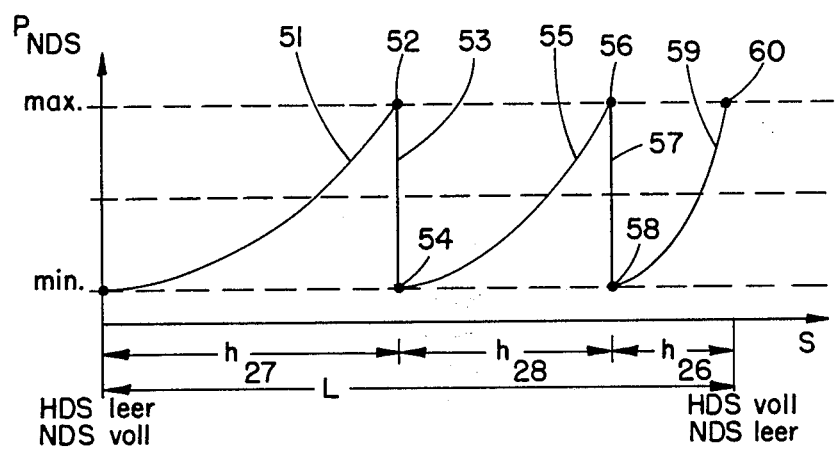

As an alternative to this the pressure piston 26 and the pressure cylinders 27 and 28 may however be so matched that the sequentially occurring strokes decrease in length, that is to say the stroke of the pressure cylinder 27 is largest, that of the pressure cylinder 28 is smaller and the stroke of the pressure piston 26 is the smallest stroke. This case is illustrated in the graph of FIG. 4. In this case the largest individual stroke, that is to say the stroke of the pressure cylinder 27 is again denoted $h_{27}$, the stroke of the pressure cylinder 28 which is smaller than this is denoted $h_{28}$ and the inherent stroke of the pressure cylinder 26 is denoted $h_{26}$. The addition of these strokes $h_{27}$, $h_{28}$ and $h_{26}$ again represents the overall stroke L, which may be performed by the piston 19 of the low pressure liquid accumulator 2 in the housing 17 when the telescopic pressure cylinder 24 is put under pressure.

The graphs of FIGS. 3 and 4 relate to a design of the telescopic cylinder 24, in which the effective pressure faces 31 on the pressure piston 26 and 41 on the pressure cylinder 28 and 33 on the pressure cylinder 27 are so matched in relation to each other that the pressure in the storage space 18 of the low pressure liquid accumulator, when the telescopic pressure cylinder 24 is put under pressure from the high pressure liquid accumulator 1, may fluctuate by equal amounts about a mean value between a constant minimum value of for example 20 bar and a constant maximum value of for example 26 bar.

In the graphs of FIGS. 3 and 4 this constant maximum pressure value is indicated by the broken line (marked max) and the minimum pressure value is indicated by the broken line marked min.

If the high pressure liquid accumulator 1 is kept empty, that is to say at its lowest pressure level of for example 170 bar and the low pressure liquid accumulator 2 is full and if the high pressure liquid accumulator 1 is to be recharged via the pump and motor unit 3, that is to say it is to be put under pressure again, the first step is for an operating device (not shown) to turn on the shut off valve 5 and, if present, the shut off valves 9 and 50. The consequence of this is that the telescopic pressure cylinder 24 will be acted upon all in all at its outermost largest pressure face 33 on the outermost pressure cylinder 27 with the lowest pressure level, present in the high pressure liquid accumulator 1, of 170 bar for example. This pressure acting on this face 33 will however not be sufficient to displace the telescopic pressure cylinder 24, because in the storage space 18 of the low pressure liquid accumulator 2 the maximum pressure 25 will still be acting on the piston 19 with a substantially larger area and this force will thus be predominant. This condition will only change when the pump and motor unit 3 then operating as a pump pumps oil from the storage space 18 of the low pressure liquid accumulator 2 and transfers it via the pressure lines 7 and 4 into the high pressure liquid accumulator, because then oil will be supplied with the same pressure in accordance with the increase in pressure in the high pressure liquid accumulator 1 to the telescopic pressure cylinder 24 as well. As soon as the pressure acting on the pressure face 33 of the same overrides the decreasing opposite pressure force acting on the piston on the storage space side the telescopic pressure cylinder 24 will be extended. When this takes place all the stroke parts 26, 27 and 28 thereof will be moved jointly, the outermost pressure cylinder 27 performing its inherent stroke $h_{27}$, whereas the other stroke parts 28 and 26 do not perform any strokes. Then the pressure in the storage space 18 of the low pressure liquid accumulator 2 will increase, something that is indicated in the graph of FIGS. 3 and 4 by the line part 51. The point 52 indicates a state in which the outermost pressure piston 26 has reached the end of its own or inherent stroke $h_{27}$, that is to say it will have come to a stop at the stroke limiting rim 38 of the receiving wall 23. Since the further supply of oil, causing an increase in pressure, to the telescopic pressure cylinder will only result in the inner pressure cylinder 28 being moved on with the pressure piston 26, it will only be the pressure face 41, which is smaller in area that the pressure face 33, on the inner pressure cylinder 28 which will be effective so that the back pressure effective in the storage space 18 will suddenly drop to the minimum level, this being indicated by the section 53 of the line and the point 54 in the graphs of FIGS. 3 and 4. As pressure continues to act on the telescopic pressure cylinder 34, that is to say as the high pressure liquid accumulator 1 is further charged, during the inherent stroke $h_{28}$ of the inner pressure cylinder a back pressure will be built up in the storage space 18, extending up to the maximum, of the low pressure liquid accumulator 2. The point 56 again indicates the position at which the inner pressure cylinder 28 has reached the end of its inherent stroke $h_{28}$, that is to say it will have moved so far that its thrust plate 42 will have abutted the stroke limiting plate 36 of the outer pressure cylinder 27, whose stroke will have already been checked.

Since as further oil is supplied to the telescopic pressure cylinder 24 it will only be possible for the pressure piston 26 to be extended, it will also only be the pressure face 31, whose area is smaller than the pressure face 41, on the pressure piston 26, which will be effective so that the back pressure effective in the storage space 18 will suddenly drop back to the minimum level, this being marked by the line part 57 and the point 58 in FIGS. 3 and 4. When the telescopic pressure cylinder 24 is put under a further pressure, that is to say as the high pressure liquid accumulator 1 is further charged, then during the inherent stroke $h_{26}$ of the pressure piston 26 a back pressure will be again built up in the storage space 18 extending up to the maximum pressure. This is indicated in FIGS. 3 and 4 by the line section 59. The point 60 indicates the pressure when the telescopic pressure cylinder 24 is fully extended.

Figure 5:
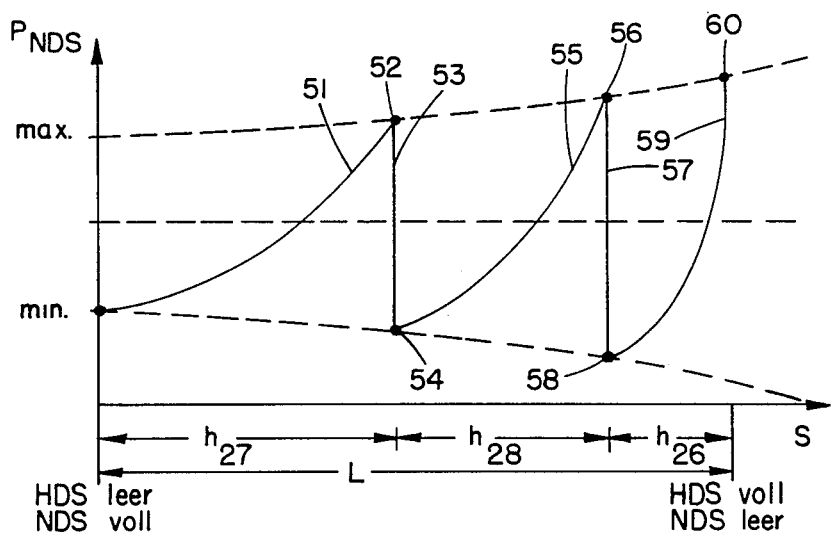

As will be seen from a comparison of the FIGS. 5 and 4, the graph of FIG. 5 relates to a telescopic cylinder 24, whose stroke parts have the same strokes $h_{27}$, $h_{28}$ and $h_{26}$ as in the graph of FIG. 4. There is however the difference that in the telescopic cylinder 24 to which the graph of FIG. 5 relates, the effective pressure faces 33 on the outer pressure cylinder 27 or 41, respectively, on the inner pressure cylinder 28 or 31 on the pressure piston bear such a relationship to each other that the pressure in the storage space 18 of the low pressure liquid accumulator 2 is able to make equal excursions about a mean value but between a minimum value (indicated by the broken line in FIG. 5 labeled "min.") decreasing as the stroke motion progresses and an increasing maximum value (marked "max." in FIG. 5 as a broken line), this being due to the pressurisation of the telescopic pressure cylinder 24 on charging of the high pressure liquid accumulator 1. At the start of the motion of the telescopic pressure cylinder 24 the minimum pressure in the storage space 18 may for instance amount to 20 bar and at the end of the complete motion of the telescopic pressure cylinder 24 it will amount to approximately 18 bar. As this takes place the maximum pressure in the storage space 18 increases from approximately 26 to approximately 28 bar. In other respects the motion of the respective telescopic pressure cylinder 24 and the action due to the motion of its individual parts is identical to that in the cases considered above. For this reason in the graph of FIG. 5 the same or like parts of curves and points are labeled with the same references as in FIGS. 3 and 4.

It will be seen on the basis of description of the functions that the provision in accordance with the invention of a telescopic cylinder 24 connected or connectable with the high pressure liquid accumulator 1 means that in the storage space 18 of the low pressure pressure liquid accumulator 2 it is possible to preclude an excessively sharp drop in pressure and thus the amount of time and energy needed for recharging of the latter becomes possible with better performance data, i.e. in a better manner, than in the prior art. To make a comparison: in the case of a conventional low pressure accumulator the pressure in the storage space, starting at a maximum of approximately 24 bar, sank to about $\frac{1}{3}$, i.e. to about 8 bar. On the other hand in the design of the present invention the pressure always fluctuates about only one mean value of for example 23 bar between a minimum pressure of respectively 20 bar and a maximum pressure of 26 bar.

In order to make possible a recharge of the low pressure liquid accumulator 2 the telescopic pressure cylinder 24 is provided with a pressure discharge means, which consists of a relief line 51, having a controlled shut off valve 62, extending from a point downstream from the part of the operating pressure line 49 placed downstream from the shut off valve 50 (which is necessary in this case) and running to the tank 12; the shut off valve 62 is only turned on in the event of discharge from the telescopic cylinder 24 by the operating means, which is not shown. In other respects however this valve is turned off. On recharge of the low pressure liquid accumulator 2 it is thus possible to rapidly let off pressure from the pressure side of the telescopic pressure cylinder 24 and the hydraulic oil present may be returned with the valve 50 shut via the relief line 61 to the tank 12.

As regards the design of the telescopic pressure cylinder 24, it is to be noted that FIG. 2 only shows one possible form thereof, from which departures may be made, more especially as regards the receiving wall 23, which does not necessarily have to be part of this telescopic pressure cylinder 24 and may be simple a receiving space for a separate telescopic pressure cylinder 24 arranged in the space, more especially on the end wall.

I claim:

1. An energy storage device for use in connection with a system supplying surplus energy and requiring additional energy from time to time, said device comprising:

high pressure and low pressure liquid accumulators,
   at least one pump and motor unit constituting a device able to be used as a pump and a motor, which is connected to said system and is adapted during charging of the high pressure liquid accumulator from the low pressure accumulator to function as a pump and on discharge thereof to function as a motor,
   and pressure lines,
   at least one of the pressure lines connecting the high pressure accumulator and the pump and motor unit having a shut off valve therein, said low pressure liquid accumulator having a piston delimiting a storage space therein, said piston being connected with a telescopic pressure cylinder bearing on an end plate of said storage space, said telescopic pressure cylinder being adapted to be connected via an operating pressure line with the high pressure liquid accumulator for pressurisation.

2. The energy storage device as claimed in claim 1 wherein the piston of the low pressure liquid accumulator has a tapering form to which the form of the storage space, opposite to the accumulator end plate, is complementary, said accumulator end plate extending in a tapering form from a peripheral rim into an interior part of the accumulator, said accumulator end plate having a central receiving wall encompassing the telescopic pressure cylinder.

3. The energy storage device as claimed in claim 1 wherein said telescopic cylinder includes a central pressure piston joined in an articulated manner with the pressure piston of said low pressure accumulator by a connecting rod, said telescopic cylinder having at least one pressure cylinder, said pressure cylinder and said pressure piston having thrust plates at a respective inner end thereof adapted to engage an overlapping rim on the respective surrounding parts to limit the strokes of the pressure piston and of the pressure cylinder.

4. The energy storage device as claimed in claim 1 comprising a constant pressure feed pump and an oil supply tank for same for the supply of oil to said accumulators to pump them up to a basic pressure level, said feed pump being connected via a check valve, adapted to only allow the passage of oil in the pumping direction, to a part of a pressure line extending between the pump and motor unit and the shut off valve to the low pressure accumulator, there being a shunting line with a controlled shut off valve therein leading from said line at a point upstream from said check valve to the tank.

5. The energy storage device as claimed in claim 4 wherein a space between the piston of the low pressure accumulator and the end plate thereof is in communication with the outside atmosphere and is connected via a supply line with the tank so as to form a pressure-less storage space for hydraulic oil to allow for an economy in designing the size of the said tank.

6. The energy storage device as claimed in claim 2 comprising at least two such pressure cylinders and wherein the operating pressure line connected with the low pressure accumulator is connected to the end plate thereof via a connection in an end plate of said receiving wall behind the thrust plate of the outermost pressure cylinder of the telescopic cylinder and branches from the part of the pressure line running between the high pressure accumulator and a shut off valve.

7. The energy storage device as claimed in claim 3 having at least two such pressure cylinders and wherein the pressure piston and the pressure cylinders are so matched to each other that when the latter are put under pressure to cause extension of said telescopic cylinder the pressure piston and the pressure cylinders perform inherent strokes of equal length.

8. The energy storage device as claimed in claim 3 having a plurality of such pressure cylinders and wherein the pressure piston and the pressure cylinders of the telescopic cylinder are so matched to each other that on pressurisation of the latter the inherent stroke of the outermost pressure cylinder is the largest one, whereas the stroke of the inner pressure cylinder is smaller and the stroke of the pressure piston is smaller than this latter stroke.

9. The energy storage device as claimed in claim 7 and wherein the pressure piston and the cylinders of the telescopic cylinder are so matched to each other that on pressurisation of the latter the inherent stroke of the outermost pressure cylinder is the largest one, whereas the stroke of the inner pressure cylinder is smaller and the stroke of the pressure piston is smaller than this latter stroke and wherein furthermore the effective pressure faces of the pressure piston and of the pressure cylinders of the telescopic cylinder are so matched to each other that on discharge of the low pressure accumulator in the full condition for charging the high pressure accumulator with a corresponding pressurisation of the telescopic cylinder via the operating pressure line from the high pressure accumulator the pressure in the storage space of the low pressure accumulator fluctuates with equal excursions from a mean value between a constant minimum value and a constant maximum value in such a way that when the largest pressure face on the outermost pressure cylinder is active the pressure increases starting at the said minimum value to reach its maximum at the completion of the inherent stroke of the pressure cylinder and then when the next stroke performing part of the telescopic cylinder, that is to say of the pressure cylinder with the next smaller pressure face area, is active the pressure immediately drops to the minimum and as the pressure cylinder continues its stroke the pressure increases again to reach the pressure maximum on the completion of the inherent stroke thereon and so on with a repetition of the said cycle for all following stroke components.

10. The energy storage device as claimed in claim 7 and wherein the pressure piston and the cylinders of the telescopic cylinder are so matched to each other that on pressurisation of the latter the inherent stroke of the outermost pressure cylinder is the largest one, whereas the stroke of the inner pressure cylinder is smaller and the stroke of the pressure piston is smaller than this latter stroke and wherein the pressure faces on the pressure piston and on pressure cylinders of the telescopic cylinder are so matched to each other that on discharge of the low pressure accumulator for charging of the high pressure accumulator with pressurisation of the telescopic pressure cylinder via the operating pressure line from the high pressure accumulator the pressure in the storage space of the low pressure accumulator fluctuates in equal excursions from a mean value between a minimum value, which becomes less with an increase in stroke and an increasing maximum value so that when the first largest pressure face on the outermost pressure cylinder is active the pressure cylinder reaches the maximum, then at the start of the stroke of the next smaller pressure face, that is to say of the next pressure cylinder the pressure immediately drops to a minimum which is smaller than the previous one and increases again as the stroke of the pressure cylinder proceeds and on the completion of the inherent stroke of the same reaches a pressure maximum greater than the previous one and so on with a repetition of the last mentioned cycle for all following stroke components in such a way that each time the next smaller pressure face becomes active there is a pressure drop to a level lower than the previous one and a subsequent rise in the pressure to a pressure maximum higher than the previous one.

11. The energy storage device as claimed in claim 6 comprising a controlled shut off valve on the operating pressure line connected with the end plate of the wall.

12. The energy storage device as claimed in claim 1 comprising a controlled shut off valve on the pressure line extending between the low pressure accumulator and the pump and motor unit in order to respond to the state in which the pressure level in the pressure space of the low pressure accumulator is higher than the feed pressure level of the pump and motor unit.

13. The energy storage device as claimed in claim 11 comprising a pressure relief means associated with said telescopic cylinder, said relief means comprising a relief line extending from the operating pressure line to the tank and a controlled shut off valve on this relief line.

14. The energy storage device as claimed in claim 13 comprising a shut off valve on said operating pressure line, said relief line being connected with the latter line at a point downstream from said shut off valve thereon.

* * * * *

UNITED STATES PATENT AND TRADEMARK OFFICE
CERTIFICATE OF CORRECTION

PATENT NO. : 4,745,745

DATED : May 24, 1988

INVENTOR(S) : Faust Hagin

It is certified that error appears in the above-identified patent and that said Letters Patent is hereby corrected as shown below:

Column 9, line 28: after "pressure" insert --increases from the minimum and on the completion of the inherent stroke of the pressure--

Signed and Sealed this

Ninth Day of May, 1989

Attest:

DONALD J. QUIGG

*Attesting Officer*

*Commissioner of Patents and Trademarks*